United States Patent [19]

Shirota et al.

[11] Patent Number: 4,517,552

[45] Date of Patent: May 14, 1985

[54] METHOD AND APPARATUS FOR N-TO-M ENCODING

[75] Inventors: Norihisa Shirota, Hadano; Takao Abe, Sagamihara, both of Japan

[73] Assignee: Sony Corporation, Tokyo, Japan

[21] Appl. No.: 380,336

[22] Filed: May 20, 1982

[30] Foreign Application Priority Data

May 26, 1981 [JP] Japan .................................. 56-79677

[51] Int. Cl.³ ............................................. H03K 13/24

[52] U.S. Cl. ............................................. 340/347 DD

[58] Field of Search ............................ 375/19; 371/56; 340/347 DD; 360/39-44

[56] References Cited

U.S. PATENT DOCUMENTS

| | | | |
|---|---|---|---|
| 3,685,033 | 8/1972 | Srivastava | 340/347 DD |
| 3,906,485 | 9/1975 | Hong | 375/19 |
| 4,387,366 | 6/1983 | Chow | 375/19 |
| 4,413,251 | 11/1983 | Adler | 340/347 DD |

FOREIGN PATENT DOCUMENTS

| | | |
|---|---|---|
| 1569076 | 6/1980 | United Kingdom . |
| 2056225 | 3/1981 | United Kingdom . |
| 2066629 | 7/1981 | United Kingdom . |

*Primary Examiner*—Charles D. Miller

*Attorney, Agent, or Firm*—Lewis H. Eslinger; Alvin Sinderbrand

[57] ABSTRACT

A method and apparatus are provided for encoding successive n-bit information words into successive m-bit code words wherein m>n. Each n-bit information word is assigned with a respective set of m-bit code words. Each set of code words is comprised of either two or four words. The words in each two-word set have zero disparity, and their first bits are of opposite logical sets. In the four-word sets, two words have positive disparity and their first bits are of opposite logical sense, and the other two words have negative disparity and their first bits also are of opposite logical sense. The particular m-bit code word that is selected from the set associated with the n-bit word commences with the same bit as the last bit of the immeditely preceding code word, and the selected code word exhibits a disparity that, when combined with the digital sum variation of the preceding encoded code words, reduces the overall digital sum variation toward zero.

22 Claims, 10 Drawing Figures

FIG. 1

| NO | GP (4, 0, 0) | GP (4, 1, 0) | C C |
|---|---|---|---|
| 1 | 0 0 0 0 1 1 1 1 | 1 1 1 1 0 0 0 0 | (4 * 4) |
| 2 | 0 0 0 1 1 1 1 0 | 1 1 1 0 0 0 0 1 | (3 4 1) |
| 3 | 0 0 1 1 1 1 0 0 | 1 1 0 0 0 0 1 1 | (2 4 2) |
| 4 | 0 1 1 1 1 0 0 0 | 1 0 0 0 0 1 1 1 | (1 4 3) |
| 5 | 0 0 1 1 0 0 1 1 | 1 1 0 0 1 1 0 0 | (2 2 2) |
| 6 | 0 0 1 1 1 0 0 1 | 1 1 0 0 0 1 1 0 | (2 3 1) |
| 7 | 0 1 1 0 0 0 1 1 | 1 0 0 1 1 1 0 0 | (1 3 2) |
| 8 | 0 1 1 1 0 0 0 1 | 1 0 0 0 1 1 1 0 | (1 3 1) |
| 9 | 0 1 1 0 0 1 1 0 | 1 0 0 1 1 0 0 1 | (1 2 1) |
| | GP (5, 0, 2) | GP (5, 1, -2) | C C |
| 10 | 0 0 0 1 1 1 1 1 | 1 1 1 0 0 0 0 0 | (3 * 5) |
| 11 | 0 0 1 1 1 1 1 0 | 1 1 0 0 0 0 0 1 | (2 5 1) |
| 12 | 0 1 1 1 1 1 0 0 | 1 0 0 0 0 0 1 1 | (1 5 2) |
| 13 | 0 1 1 0 0 1 1 1 | 1 0 0 1 1 0 0 0 | (1 2 3) |
| 14 | 0 1 1 1 0 0 1 1 | 1 0 0 0 1 1 0 0 | (1 3 2) |
| 15 | 0 1 1 1 1 0 0 1 | 1 0 0 0 0 1 1 0 | (1 4 1) |
| | GP (5, 0, -2) | GP (5, 1, 2) | C C |
| 16 | 0 0 0 0 0 1 1 1 | 1 1 1 1 1 0 0 0 | (5 * 3) |
| 17 | 0 1 1 1 0 0 0 0 | 1 0 0 0 1 1 1 1 | (1 3 4) |
| 18 | 0 0 1 1 1 0 0 0 | 1 1 0 0 0 1 1 1 | (2 3 3) |
| 19 | 0 0 0 1 1 1 0 0 | 1 1 1 0 0 0 1 1 | (3 3 2) |
| 20 | 0 0 0 0 1 1 1 0 | 1 1 1 1 0 0 0 1 | (4 3 1) |
| 21 | 0 1 1 0 0 0 0 1 | 1 0 0 1 1 1 1 0 | (1 4 1) |
| 22 | 0 0 1 1 0 0 0 1 | 1 1 0 0 1 1 1 0 | (2 3 1) |
| 23 | 0 0 0 1 1 0 0 1 | 1 1 1 0 0 1 1 0 | (3 2 1) |
| | GP (6, 0, 4) | GP (6, 1, -4) | C C |
| 24 | 0 1 1 1 1 1 1 0 | 1 0 0 0 0 0 0 1 | (1 6 1) |
| 25 | 0 0 1 1 1 1 1 1 | 1 1 0 0 0 0 0 0 | (2 * 6) |
| | GP (6, 0, -4) | GP (6, 1, 4) | C C |
| 26 | 0 1 1 0 0 0 0 0 | 1 0 0 1 1 1 1 1 | (1 2 5) |
| 27 | 0 0 1 1 0 0 0 0 | 1 1 0 0 1 1 1 1 | (2 2 4) |
| 28 | 0 0 0 1 1 0 0 0 | 1 1 1 0 0 1 1 1 | (3 2 3) |
| 29 | 0 0 0 0 1 1 0 0 | 1 1 1 1 0 0 1 1 | (4 2 2) |
| 30 | 0 0 0 0 0 1 1 0 | 1 1 1 1 1 0 0 1 | (5 2 1) |
| 31 | 0 0 0 0 0 0 1 1 | 1 1 1 1 1 1 0 0 | (6 * 2) |

FIG. 2

| | | | | CC |
|---|---|---|---|---|
| 0 | 1 | 0 0 0 0 1 1 1 1 | 1 1 1 1 0 0 0 0 | (4 X 4) |
| 1 | 2 | 0 0 0 1 1 1 1 0 | 1 1 1 0 0 0 0 1 | (3 4 1) |
| 2 | 3 | 0 0 1 1 1 1 0 0 | 1 1 0 0 0 0 1 1 | (2 4 2) |
| 3 | 4 | 0 1 1 1 1 0 0 0 | 1 0 0 0 0 1 1 1 | (1 4 3) |
| 4 | 5 | 0 0 1 1 0 0 1 1 | 1 1 0 0 1 1 0 0 | (2 2 2) |
| 5 | 6 | 0 0 1 1 1 0 0 1 | 1 1 0 0 0 1 1 0 | (2 3 1) |
| 6 | 7 | 0 1 1 0 0 0 1 1 | 1 0 0 1 1 1 0 0 | (1 3 2) |
| 7 | 8 | 0 1 1 1 0 0 0 1 | 1 0 0 0 1 1 1 0 | (1 3 1) |
| 8 | 9 | 0 1 1 0 0 1 1 0 | 1 0 0 1 1 0 0 1 | (1 2 1) |
| 9 | 10 | 0 0 0 1 1 1 1 1 | 1 1 1 0 0 0 0 0 | (3 X 5) |
| | 17 | 0 1 1 1 0 0 0 0 | 1 0 0 0 1 1 1 1 | (1 3 4) |
| 10 | 11 | 0 0 1 1 1 1 1 0 | 1 1 0 0 0 0 0 1 | (2 5 1) |
| | 18 | 0 0 1 1 1 0 0 0 | 1 1 0 0 0 1 1 1 | (2 3 3) |
| 11 | 12 | 0 1 1 1 1 1 0 0 | 1 0 0 0 0 0 1 1 | (1 5 2) |
| | 19 | 0 0 0 1 1 1 0 0 | 1 1 1 0 0 0 1 1 | (3 3 2) |
| 12 | 13 | 0 1 1 0 0 1 1 1 | 1 0 0 1 1 0 0 0 | (1 2 3) |
| | 21 | 0 1 1 0 0 0 0 1 | 1 0 0 1 1 1 1 0 | (1 4 1) |
| 13 | 14 | 0 1 1 1 0 0 1 1 | 1 0 0 0 1 1 0 0 | (1 3 2) |
| | 22 | 0 0 1 1 0 0 0 1 | 1 1 0 0 1 1 1 0 | (2 3 1) |
| 14 | 15 | 0 1 1 1 1 0 0 1 | 1 0 0 0 0 1 1 0 | (1 4 1) |
| | 23 | 0 0 0 1 1 0 0 1 | 1 1 1 0 0 1 1 0 | (3 2 1) |
| 15 | 24 | 0 1 1 1 1 1 1 0 | 1 0 0 0 0 0 0 1 | (1 6 1) |
| | 28 | 0 0 0 1 1 0 0 0 | 1 1 1 0 0 1 1 1 | (3 2 3) |

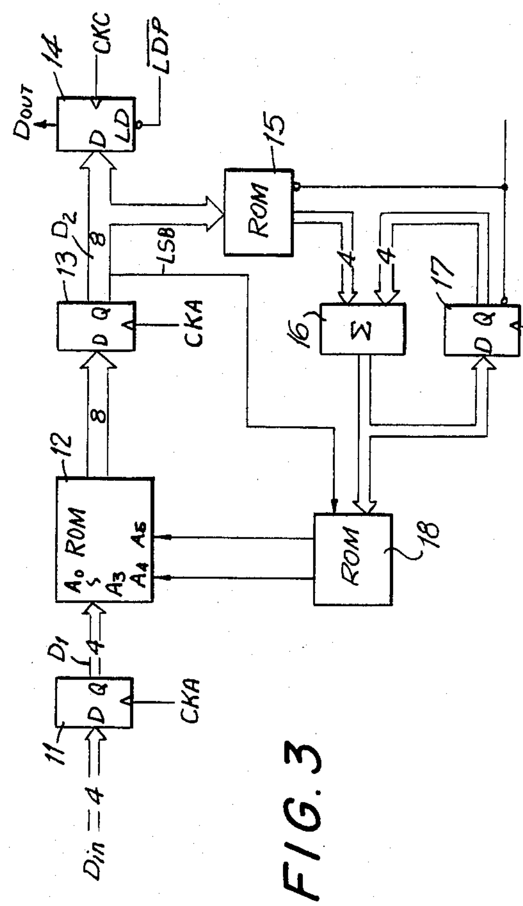
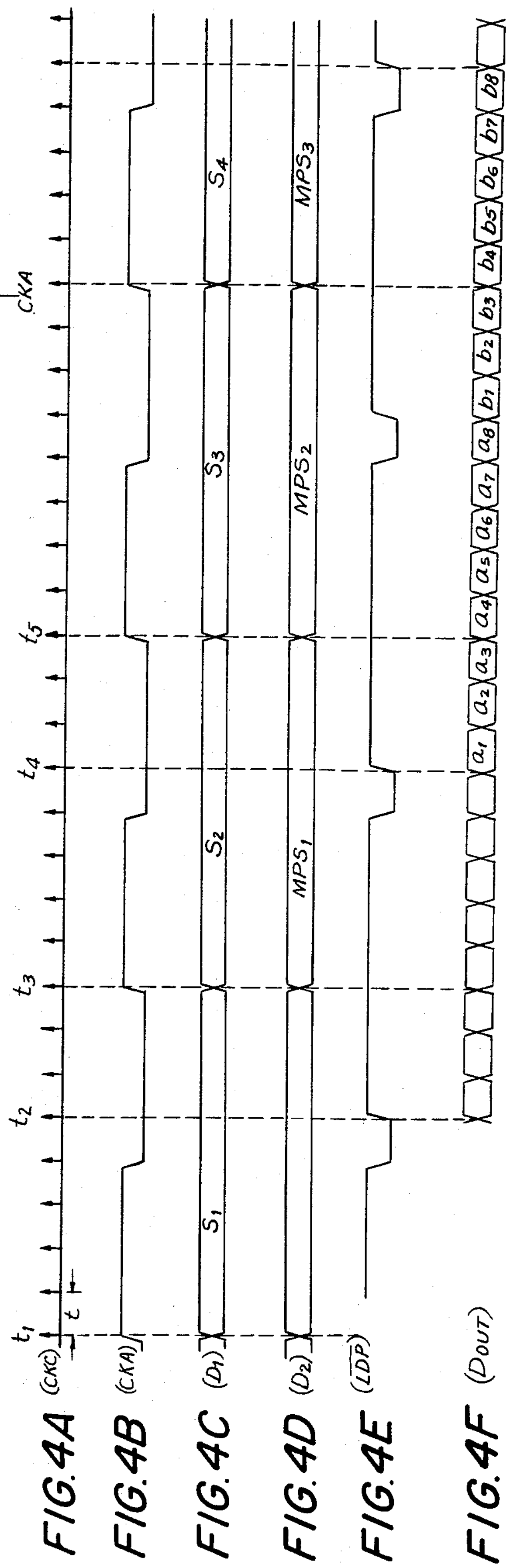

FIG. 5

| m \ a | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|
| 4 | 2 | 1 | | | | | | | | | | | | | | 3 |
| 5 | | 2 | 1 | | | | | | | | | | | | | 3 |
| 6 | | 4 | 2 | 1 | | | | | | | | | | | | 7 |
| 7 | | | 5 | 2 | 1 | | | | | | | | | | | 8 |
| 8 | | | 9 | 6 | 2 | 1 | | | | | | | | | | 18 |
| 9 | | | | 12 | 7 | 2 | 1 | | | | | | | | | 22 |
| 10 | | | | 21 | 15 | 8 | 2 | 1 | | | | | | | | 47 |
| 11 | | | | | 29 | 18 | 9 | 2 | 1 | | | | | | | 59 |
| 12 | | | | | 50 | 38 | 21 | 10 | 2 | 1 | | | | | | 122 |
| 13 | | | | | | 71 | 48 | 24 | 11 | 2 | 1 | | | | | 157 |
| 14 | | | | | | 121 | 96 | 59 | 27 | 12 | 2 | 1 | | | | 318 |
| 15 | | | | | | | 175 | 125 | 71 | 30 | 13 | 2 | 1 | | | 417 |
| 16 | | | | | | | 296 | 243 | 158 | 84 | 33 | 14 | 2 | 1 | | 830 |

METHOD AND APPARATUS FOR N-TO-M ENCODING

BACKGROUND OF THE INVENTION

This invention relates to a method and apparatus for encoding a n-bit information word into a m-bit code word, the encoded code words exhibiting desirable characteristics, for example, for magnetic recording.

Recently, new applications have been introduced for digital recording techniques. For example, digital video tape recorders (DVTR) have been developed, wherein a composite color television signal in analog form is converted to a digital signal, and the digital video signal then is recorded directly on a record medium, such as magnetic tape. To assure accurate reproduction of the video signal, it is advantageous to encode the digital signal, prior to recording, in a format whereby inherent limitations of the magnetic recording system are avoided. One proposal for a digital VTR is described in, for example, copending application Ser. No. 192,358 now U.S. Pat. No. 4,329,708.

It is known that in magnetic recording, a DC component of the digital signal cannot be reproduced. Generally, therefore, the bit transitions of the recorded digital signals are detected, and the original digital signal is reconstructed therefrom. Since the original DC component of the digital signal is lost, it is advantageous to encode that signal in a form whereby, over a period of time, the overall DC component of the encoded signal is equal or close to zero. Various encoding techniques have been proposed to accomplish the foregoing.

In one encoding technique which has been proposed to minimize the overall DC component of the encoded digital signals, n-bit information words are represented by corresponding m-bit code words, wherein $m>N$, and the so-called "disparity" of each m-bit code word is equal to zero. The word "disparity" as understood herein refers to the DC component of the code word. If a binary "1" is represented as the value $+1$ and a binary "0" is represented as the value $-1$, then the difference between all of the binary "1"s and "0"s which constitute a code word will represent a positive or negative number or zero, depending upon the difference between the number of "1"s and "0"s. This number is the disparity of the code word. The sum of all of the disparities of a string, or series, of successive code words is the "digital sum variation" of those words. Thus, the digital sum variation may be thought of as a running sum, or total, of the individual disparities of each code word, and represents the overall, or net, DC component of the successive code words that have been produced.

In one encoding technique, each code word is formed of a sufficient number of bits such that every n-bit information word can be represented by a respective m-bit code word having zero disparity. For example, a (4, 6; 0) coding technique operates to encode an original 4-bit information word into a 6-bit code word, each 6-bit code word exhibiting zero disparity. It will be appreciated that a 4-bit code word is capable of representing only sixteen different words, and that there are twenty zero disparity words available in 6-bit codes.

Another encoding technique wherein the digital sum variation is minimized is the so-called (8, 10) encoding. This technique is described in copending application Ser. No. 199,598, now U.S. Pat. No. 4,348,659. As described therein, of the 256 information words which are available from the 8-bit digital information words, only 252 10-bit code words exhibit zero disparity. The remaining four 8-bit information words thus are represented by those 10-bit code words whose disparity is equal to $+1$ or $-1$. The non-zero disparity code words are judiciously assigned to those information words which exhibit the lowest probability of occurrence. Moreover, each of the four 8-bit information words which must be represented by a non-zero disparity code word is represented by one positive disparity code word and one negative disparity code word. Thus, when a non-zero disparity code word of, for example, positive disparity is selected, the next-selected non-zero disparity code word exhibits negative disparity. Thus, the overall digital sum variation is minimized.

In the aforedescribed encoding techniques, and particularly, the (8, 10) encoding, the wavelength of the recorded digital signal may become too short. That is, many of the code words which will be recorded include successive bit transitions, such as 101010 . . . , resulting in a high frequency of transitions and, thus, a short wavelength. This high transition density results in a reduction in the recording density, which is a disadvantage. It is desirable, therefore, to increase the minimum wavelength of the encoded digital signal to be recorded, as by increasing the minimum interval, or separation, between successive bit transitions.

Another disadvantage of the aforedescribed encoding techniques, and particularly the (8, 10) conversion is that waveform interference may result therefrom. In the (8, 10) conversion, a 10-bit code word must be recorded in the same space as the original 8-bit information word. This means that the bit interval for each bit of the 10-bit code word is 0.8 times the bit interval of each 8-bit information word. Consequently, the minimum time interval between transitions of the 10-bit code word is equal to the bit interval thereof, or 0.8T, wherein T is the assumed bit interval of the 8-bit information word. The maximum time interval between transitions of the 10-bit code word is equal to the time duration of the word itself, or 8T. Hence, the ratio of the maximum to minimum transition time intervals ($T_{max}/T_{min}$) is equal to 10. Such a large ratio may result in waveform interference and, moreover, may deleteriously influence the self-clocking of the reproduced 10-bit code word. Still further, the detecting window during which each bit of the 10-bit code word must be detected, or sensed, in order to discriminate binary "1"s from "0"s is reduced to the bit interval of the 10-bit code word, or 0.8T. Hence, there is less time to discriminate the bits of the 10-bit code word, and this may result in erroneous decoding of the digital signals and re-conversion back to original analog form.

OBJECTS OF THE INVENTION

Therefore, it is an object of the present invention to provide an improved encoding technique whereby the aforementioned defects and disadvantages are avoided.

Another object of this invention is to provide an improved method and apparatus for encoding n-bit information words into m-bit code words.

A still further object of this invention is to provide a n, m encoding technique wherein the resultant code words exhibit minimal digital sum variation.

An additional object of this invention is to provide an improved n, m encoding technique wherein the interval between transitions of the n-bit code words is greater than a predetermined amount and, preferably, is greater than two bit cell intervals.

Yet another object of this invention is to provide an improved method and apparatus for encoding successive n-bit information words into successive m-bit code words, the latter being readily adapted for magnetic recording.

Another object of this invention is to provide an improved (n, m) encoding technique wherein the encoded digital signal, if magnetically recorded, exhibits a satisfactory wavelength.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for encoding successive n-bit information words into successive m-bit code words having no less than a predetermined interval between bit transitions. Each n-bit information word is assigned with a respective set of m-bit code words. Some of these sets are formed of two code words, and the remaining sets are formed of four code words. In the 2-code word sets, the two code words both exhibit zero disparity and commence with opposite binary bits (i.e. one commences with a binary "0" and the other commences with a binary "1"). In the 4-code word sets, two of the code words exhibit positive disparity and the other two exhibit negative disparity but of the same absolute magnitude. The positive disparity code words commence with opposite bits, and the negative disparity code words likewise commence with opposite bits. A particular set of code words is selected by the n-bit information word that is to be encoded, and the particular code word which is chosen from the selected set commences with the same bit as the last bit of the immediately preceding code word and, moreover, exhibits a disparity that, when combined with the digital sum variation of the preceding encoded code words, reduces the overall digital sum variation toward zero.

In one embodiment, a 4-bit information word is converted into an 8-bit code word. In this embodiment, the minimum interval between bit transitions is no less than two bit intervals. In this same embodiment, the maximum interval between bit transitions is no greater than nine bit intervals.

In accordance with one aspect of this invention, at least two consecutive "interior" bits of the code word are of the same logical sense. The "interior" bits are those bits which lie between the first (or most significant bit) and last (or least significant bit) bits. Thus, for an 8-bit code word, the "interior" bits are the second, third, fourth, fifth, sixth and seventh bits, and two consecutive ones of these bits exhibit the same logical sense. That is, at least two consecutive interior bits are binary "1"s or "0"s.

BRIEF DESCRIPTION OF THE DRAWINGS

The following detailed description, given by way of example, will best be understood in conjunction with the accompanying drawings in which:

FIG. 1 is a chart which represents the various sets of, for example, 8-bit code words which may be used to represent each 4-bit information word;

FIG. 2 is a chart of those sets of 8-bit words selected from the chart of FIG. 1 which are used in the present invention to represent the 4-bit information words;

FIG. 3 is a block diagram of one embodiment of the present invention;

FIGS. 4A–4F are timing diagrams which are useful in understanding the operation of the embodiment shown in FIG. 3; and FIG. 5 is a chart showing those m-bit code words which satisfy the criteria of the encoding technique in accordance with the present invention.

DETAILED DESCRIPTION OF THE PREFERRED EMBODIMENTS

In the interest of simplification, the encoding technique of the present invention first will be described for (4, 8) conversion. That is, successive 4-bit information words are converted into successive 8-bit code words, with each 4-bit information word being represented by an encoded 8-bit encoded word.

It is appreciated that there are 256 possible 8-bit code words. Of these 256 possibilities, only those 8-bit code words having at least two consecutive interior bits of the same logical sense are used. There are thirty-one different sets of code words which satisfy the foregoing, with the exclusion of those 8-bit words having more than six bits of one logical sense. FIG. 1 is a chart representing these thirty-one different sets, each set consisting of complementary 8-bit words. The two columns identified as "GP" list these complementary 8-bit words. For convenience, the words included in the left column all commence with a binary "0", and all the words in the right column are respective complements thereof and all commence with a binary "1".

Each column is further identified as "GP (a, b, c)". Of the foregoing designations, "a" represents the number of majority bits in the 8-bit word. That is, in the left column where the binary "0"s outnumber the binary "1"s, a is the total number of binary "0"s included in that word. In the right column wherein the binary "1"s outnumber the binary "0"s, a is the total number of binary "1"s included in that word (a=4 when there are an equal number of binary "0"s and "1"s);

"b" represents the starting bit in each word; and it is seen that b="0" for the left column and b="1" for the right column;

"c" represents the disparity of the 8-bit word. Thus, the 8-bit word included in sets Nos. 1–9 are identified as GP (4, 0, 0), wherein there are an equal number of binary "0"s and "1"s, each 8-bit word commences with a binary "0", and the disparity of each word is equal to zero. Sets Nos. 1–9 also include the binary words identified as GP (4, 1, 0), wherein there are an equal number of "0"s and "1"s, each 8-bit word commences with a binary "1", and the disparity of each word is equal to zero.

Sets Nos. 10–15 include the 8-bit words identified as GP (5, 0, 2), wherein there are five bits of one logic sense and three bits of the other, each 8-bit word commences with a binary "0", and the disparity of each 8-bit word is equal to +2 (thus indicating that there are five binary "1"s). These sets also are identified by the 8-bit words GP (5, 1, −2), wherein there are five binary "0"s in each word, each word commences with binary "1", and the disparity of each word is equal to −2.

Sets Nos. 16–23 are identified as the 8-bit words GP (5, 0, −2), wherein each word contains five binary "0"s, each word commences with a binary "0", and each word exhibits a disparity equal to −2; and these sets also are identified by the 8-bit words GP (5, 1, 2), wherein each word contains five binary "1"s, each word commences with a binary "1" and each word exhibits a disparity equal to +2.

Sets Nos. 24 and 25 are identified by the 8-bit words GP (6, 0, 4), wherein each word contains six binary "1"s, each word commences with a binary "0" and each word has a disparity equal to +4. These sets also are identified by the 8-bit words GP (6, 1, −4), wherein each 8-bit word contains six binary "0"s, each word commences with a binary "1" and each word exhibits a disparity equal to −4.

Finally, sets Nos. 26–31 are identified by the 8-bit words GP (6, 0, −4), wherein each word contains six binary "0"s, each word commences with a binary "0" and each word exhibits a disparity equal to −4. These sets also are identified by the 8-bit words GP (6, 1, 4), wherein each word contains six binary "1"s, each word commences with a binary "1" and each word exhibits a disparity equal to +4.

In the chart illustrated in FIG. 1, each set of 8-bit words also includes a designation CC (d, e, f). In this designation, "d" represents the number of consecutive bits, commencing with the first, or left-most bit, having the same logical sense;

"e" represents the largest number of consecutive bits in the middle of the 8-bit word; and "f" represents the consecutive number of bits, commencing with the last, or right-most bit, of the same logical sense.

Thus, for set No. 2, d=3 because there are three consecutive binary "0"s (or binary "1"s) commencing with the first bit. Also, e=4 because there are four consecutive binary "1"s (or "0"s) in the middle portion of the word. Finally, f=1 because there is only a single binary "0" (or "1") at the end of the word.

Similarly, for set No. 22, d=2 because there are two consecutive binary "0"s (or "1"s) at the beginning of the word; e=3 because the largest number of consecutive bits in the middle of the word is three binary "0"s (or "1"s); and f=1 because the word ends with a single binary "1" (or "0").

It is recognized that in set No. 1, e=X because there are four consecutive bits of one logical sense at the beginning of the word and four consecutive bits of the opposite logical sense at the end of the word, resulting in no consecutive bits in the middle of the word. Likewise, e=X for sets Nos. 10, 16, 25 and 31 for similar reasons.

Of the thirty-one sets of 8-bit code words shown in FIG. 1, the first nine sets (sets Nos. 1–9) all are formed of zero disparity code words. As shown, each set is formed of a pair of complementary code words, and each pair of code words is used to represent a respective 4-bit information word. For example, both words in set No. 1, that is, words [00001111] and [11110000] are used to represent the 4-bit information word [0000]. Likewise, both words included in set No. 2 are used to represent the 4-bit information word [0001]. Thus, each of sets Nos. 1–9 is used to represent a respective one of the first nine 4-bit information words [0000], [0001], . . . [1000]. These sets of code words are seen to be the GP (4, 0, 0) and GP (4, 1, 0) code words.

It is recognized that the remaining sets Nos. 10–31 are formed of non-zero disparity code words. Whereas each of the first nine 4-bit information word is represented by a pair of complementary zero disparity code words, the non-zero disparity code words representing the remaining 4-bit information words are grouped into sets of four words each. Each set of four code words is used to represent a respective one of the remaining seven 4-bit information words. Thus, one of these 4-bit information words may be represented by a code word having positive or negative disparity and may commence with a binary "0" or "1". Moreover, each 4-bit information word which is represented by a set of non-zero disparity code words is represented by a respective one of four code words in each of the groups identified as GP (5, 0, 2), GP (5, 1, −2), GP (5, 0, −2) and GP (5, 1, 2). That is, no two code words are selected from the same group. From the chart shown in FIG. 1, it is seen that, for the groups of code words wherein a=5, six separate sets of such code words are available. For example, the 4-bit information word [1001] may be represented by the complementary pairs of code words included in set No. 10 and also by the complementary pairs of code words included in set No. 17. These four code words constitute one set of code words which is assigned to, and thus representative of, the 4-bit information [1001]. As another example, the 4-bit information word [1010] is represented by the pair of complementary code words included in set No. 11 and also by the pair of complementary code words included in set No. 18. Likewise, the 4-bit information word [1011] is represented by the pair of complementary code words included in set No. 12 and also by the pair of complementary code words included in set No. 19. The code words included in sets Nos. 13 and 21 are assigned to, and thus represent, the 4-bit information word [1100]. The code words included in sets Nos. 14 and 22 are assigned to represent the 4-bit information word [1101]; and the code words included in sets Nos. 15 and 23 are assigned to represent the 4-bit information word [1110]. Sets Nos. 16 and 20 are not assigned to a 4-bit information word because the code words included in these sets are not as advantageous for magnetic recording as are the other code words in sets Nos. 10–15, 17–19 and 21–23.

Finally, the last 4-bit information word [1111] should be represented by one 8-bit code word from each of the groups GP (6, 0, 4), GP (6, 1, −4), GP (6, 0, −4) and GP (6, 1, 4). It is preferred to assign the complementary pairs of code words included in sets Nos. 24 and 28 to this information word.

Although not shown in the chart of FIG. 1, one set of code words included in the groups GP (7, 0, −6), GP (7, 1, 6), GP (7, 0, 6) and GP (7, 1, −6) also may satisfy the aforementioend basic criteria. However, this set of code words is less advantageous for magnetic recording and, therefore, is not used to represent a 4-bit information word. Nevertheless, when an 8-bit word is to be used to represent an information word, that is, when m=8, eighteen different sets of code words satisfy the above-mentioned criteria, wherein each of nine of these sets is formed of a pair of complementary, zero disparity code words, and the remaining sets are formed of four non-zero disparity code words, these four non-zero disparity code words consisting of two separate pairs of complementary words.

Of the eighteen available sets of code words, only sixteen are needed to encode a 4-bit information word ($2^4=16$). The code words included in these sixteen sets are selected such that a predetermined maximum interval between bit transitions will not be exceeded. As an example, if the maximum bit transition interval is selected as 9T, wherein T is equal to the bit interval of a code word, then the sixteen 4-bit information words 0, 1, 2, . . . 15, or [0000], [0001], [0010], . . . [1111] may be represented by the sets illustrated in the chart of FIG. 2. As mentioned above, and as is illustrated in FIG. 2, the 4-bit information words having the numerical values 0–8 are represented by sets Nos. 1–9, respectively, and each set is comprised of a pair of complementary zero disparity 8-bit code words. The remaining 4-bit information words having the numerical values 9, 10, 11, 12, 13, 14 and 15 are represented by sets 10 and 17, 11 and 18, 12 and 19, 13 and 21, 14 and 22, 15 and 23, and 24 and 28, respectively. Each of the sets which represent these 4-bit information words is formed of two pairs of non-zero disparity code words, each pair consisting of complementary code words.

In accordance with the encoding technique of the present invention, successive information words are encoded into corresponding, successive code words, with the first or beginning bit of a code word being of the same logical sense as the last, or terminating bit of the immediately preceding code word. Furthermore, and in accordance with this invention, if an information word is to be represented by a non-zero disparity code word, then, as shown in FIG. 2, one of four code words must be selected to represent that information word. Therefore, in addition to the aforementioned requirement that the code word commence with a bit having the same logical sense as the terminating bit of the immediately preceding code word, the disparity of the selected code word must be such that the digital sum variation for all of the preceding code words be reduced toward zero. Thus, if a preceding code word terminates with a binary "0", the next-following code word is selected from column I of the chart shown in FIG. 2. Conversely, if the last bit of the preceding code word is a binary "1", then the next-following code word is selected from those words in column II. It will be seen that each information word which is represented by a non-zero disparity code word is assigned with two code words having positive disparity and commencing with bits of opposite logical sense, and also with two words having negative disparity and also commencing with bits of opposite logical sense. For example, the information word having the numerical value "9" is represented by the two code words [00011111] and [10001111], both of which have positive disparity and commence with bits of opposite logical sense (binaly "0" and binary "1"). Also, the information word having the numerical value "8 is represented by the additional code words [01110000] and [11100000] which have negative disparity and commence with bits of opposite logical sense. Stated otherwise, and as shown in the chart of FIG. 2, the information word having the numerical value "9" is represented by two pairs of complementary code words, the words in each pair having equal but opposite disparities and commencing with bits of opposite logical sense. It will be appreciated, therefore, that if the preceding code word terminates in, for example, a binary "0", and if the next information word to be encoded has the numerical value "9", then either the code word [00011111] or the code word [01110000] is selected. The particular one of these code words which is selected is a function of the digital sum variation. If the digital sum variation which has been accumulated from the preceding code words is positive, then the one code word having negative disparity, that is, code word [01110000] will be chosen. Alternatively, if the digital sum variation which has been accumulated from the preceding code words is negative, then the code word having positive disparity, that is, the code word [00011111] is chosen.

In accordance with the foregoing, let it be assumed that the successive 4-bit information words having the numerical values "0", "2", "5", "9" and "11" are encoded. The corresponding 8-bit code words which are selected successively are as follows: [00001111], [11000011], [11000110], [00011111] and [10000011]. It is seen that the digital sum variation of these five successive 8-bit code words is equal to zero. Moreover, it is seen that each code word commences with a bit having the same logical sense as the last, or terminating bit of the preceding code word. Furthermore, and as will be seen from the chart shown in FIG. 2, there always will be at least two consecutive binary "0"s or "1"s in the successive code words. This is insured because of the code words which are selected in the respective sets and, moreover, because the first and last bits of successive code words must be of the same logical sense. Therefore, since the minimum interval between bit transitions is equal to two bit intervals, the effective wavelength of the recorded code words is prevented from being too short, a disadvantage which is mentioned in the beginning portion of this specification. Hence, proper recording densities are obtained.

From the designation CC in the chart shown in FIG. 2, and particularly the values of e and f, it is recognized that the minimum interval between adjacent transitions is 2T, and the maximum interval is 9T, wherein T is one bit cell interval. Hence, the ration $T_{max}/T_{min}$ is equal to 4.5. This ratio is substantially less than the corresponding ratio in the (8, 10) conversion, which demonstrates the superiority of the encoding scheme of the present invention with respect to waveform interference and self-clocking reliability.

In the chart shown in FIG. 2, each information word is represented by at least one pair of complementary code words. Although the use of complementary code words to represent the same information word is advantageous, it is not an absolute necessity. The advantage of using complementary code words is the ability to decode a reproduced code word even if the polarity of that reproduced word is reversed, as by inadvertently reversing the polarity of the reproducing head. For example, let it be assumed that the code word [00110011] is recorded. Let it be further assumed that, because of polarity reversal at the reproducing head, this code word is reproduced as [11001100]. From the chart shown in FIG. 2 it will be seen that, notwithstanding this polarity reversal of the reproducing head, the information word having the numerical value "4" is satisfactorily decoded.

One embodiment of encoding apparatus for carrying out the present invention is illustrated in FIG. 3. This apparatus includes a memory device, such as a read only memory (ROM) 12, which is adapted to store a "look-up" table corresponding to the chart shown in FIG. 2, another ROM 15, which is adapted to store a representation of the disparity of each of the code words stored in ROM 12, an adder 16, a temporary store, or latch circuit 17 and another ROM 18. ROM 12 includes address terminals $A_0$–$A_3$ which are adapted to receive the respective bits of an input 4-bit information word. The information word $D_{in}$ is comprised of bits $A_0$, $A_1$, $A_2$, $A_3$ and is temporarily stored in a latch circuit 11 in response to a latch pulse CKA supplied to the clock terminal of the latch circuit. The temporarily stored 4-bit information word is used to select a respective one of the sixteen sets stored in ROM 12, which set contains the code words that represent the received information word. ROM 12 includes two additional address terminals $A_4$ and $A_5$ which are coupled to ROM 18. These additional address terminals $A_4$ and $A_5$ received additional address bits which serve to select the particular code word included in the set of code words which has been initially selected, or addressed, by the input information word. As will be described, address bit $A_4$ is used to select, or address, the code word or words included in the initially selected set which commences with a bit having the same logical sense as the last bit of the previously selected code word. Additional address bit $A_5$ is used to select, or address, the code word included in the selected set having proper disparity.

The 8-bit code word which is addressed by address bits $A_0$–$A_5$ is read out from ROM 12, preferably in parallel, and temporarily stored in a latch circuit 13 in response to latch pulse CKA. This 8-bit code word is supplied to ROM 15 and is used as an address to read out from ROM 15 the digital representation of the disparity of this temporarily stored 8-bit code word. As an alternative, a disparity calculating circuit may be provided in place of ROM 15. For example, the disparity calculating circuit may include a counter whose count is incremented in response to each binary "1" and whose count is decremented in response to each binary "0". Such a counter may be used to provide a running total, or sum, of the digital sum variation of successively provided 8-bit code words. Other examples of a disparity calculating circuit which may be used in place of ROM 15 are described in aforementioned copending application Ser. No. 201,781.

In addition to being supplied to ROM 15, the last, or least significant, bit of the 8-bit code word read out of ROM 12 and temporarily stored in latch circuit 13 is supplied to ROM 18. This least significant bit is used to generate address bit $A_4$ and, alternatively, may be supplied directly to address bit terminal $A_4$ of ROM 12.

Adder 16 is coupled to ROM 15 to sum the disparity of the 8-bit code word temporarily stored in latch circuit 13 with the digital sum variation of the preceding, successive code words. It is seen that the digital sum variation thus is updated with the disparity of this code word. The updated digital sum variation is provided at the output of adder 16 and is stored in latch circuit 17 in response to latch pulse CKA. Thus, latch circuit 17 stores the digital sum variation derived from the preceding, successive code words, and this digital sum variation is summed in adder 16 with the disparity of the latest code word that is read out from ROM 12. It will be appreciated that, when the next input information word is supplied to ROM 12, latch circuit 17 is triggered to store the updated digital sum variation produced at the output of adder 16. This permits the disparity of the next-produced code word to be summed with the digital sum variation that has been derived from all of the preceding successive code words.

The updated digital sum variation produced at the output of adder 16 also is coupled to ROM 18. If the digital sum variation is, for example, positive, ROM 18 is responsive thereto to produce the address bit $A_5$ which addresses, or selects, a code word having negative disparity. Alternatively, if the updated digital sum variation is negative, ROM 18 produces address bit $A_5$ which calls for a code word having positive disparity. Since the digital sum variation is constrained within predetermined limits, all possible values of the digital sum variation within this range may be used as an address signal, and ROM 18 may store an appropriate binary "1" or "0" at each addressable location therein. Alternatively, the polarity of the updated digital sum variation provided at the output of adder 16 may be detected, and this detected polarity then may be used to produce a binary "1" or "0" address bit $A_5$.

The temporarily stored 8-bit code word in latch circuit 13 also is supplied to a shift register 14 and is loaded therein in response to a negative-going load pulse $\overline{LDP}$. The code word stored in shift register 14 then is read out therefrom, serially-by-bit, in response to successive clock pulses CKC. The serially read out code word $D_{out}$ then may be recorded.

The manner in which the encoding apparatus illustrated in FIG. 3 operates now will be described with reference to the timing diagrams shown in FIGS. 4A–4F. FIG. 4A represents the clock pulses CKC which are supplied to shift register 14 and which are used to read out the stored 8-bit code word therefrom, serially-by-bit. A suitable source (not shown) of clock pulses may be provided; and a frequency divider may be used to divide the frequency of those clock pulses to produce the latch pulse CKA shown in FIG. 4B. As an example, latch circuit 11 may be triggered in response to the positive transition of latch pulse CKA to store the 4-bit input information word $S_i$, as illustrated in FIG. 4C. Thus, at time $t_1$, the first input information word $S_1$ is stored in latch circuit 11.

At the same time $t_1$ that latch circuit 11 stores the input information word $S_1$, the 8-bit code word MPS which had been produced to represent the preceding information word is stored in latch circuit 13. Also at this time $t_1$, the updated digital sum variation that had been produced at the output of adder 16 is stored in latch circuit 17.

The last, or least significant, bit of the preceding code word is used to produce the address bit $A_4$ supplied to ROM 12. Thus, if the last bit of the preceding code word was a binary "0", then $A_4$="0". Conversely, if the last bit of the preceding code word was a binary "1", then $A_4$="1".

Also, the disparity of the preceding code word stored in latch circuit 13 is determined by ROM 15. This disparity is summed in adder 16 with the digital sum variation derived from those code words which went before the preceding code word, which digital sum variation now is stored in latch circuit 17. The updated digital sum variation produced at the output of the adder is used by ROM 18 to produce the address bit $A_5$. Furthermore, the updated digital sum variation is stored in latch circuit 17 in response to the next latch pulse CKA.

Suitable circuitry (not shown) may be provided to produce the load pulse $\overline{LDP}$ shown in FIG. 4A. For example, the load pulse may be produced in response to the negative transition of latch pulse CKA. Alternatively, a counter circuit may be provided to produce the load pulse $\overline{LDP}$ after, for example, eight successive clock pulses CKC are counted. In any event, shift register 14 is loaded with the 8-bit code word stored in latch circuit 13 in response to the positive transition of the load pulse $\overline{LDP}$ shown in FIG. 4E. Thereafter, from time $t_2$, for example, the code word loaded into shift register 14 is serially read out therefrom, as represented in FIG. 4F.

From the foregoing description, it is appreciated that at time $t_3$, the code word $MPS_1$ which represents the information word $S_1$ is loaded into latch circuit 13. At this same time $t_3$, the next-following input information word $S_2$ is loaded into latch circuit 11, as shown in FIG. 4C. The respective bits of information word $S_2$ are used as the address bits $A_0$–$A_3$, respectively, for selecting the appropriate set of code words to represent information word $S_2$. The least significant bit of code word $MPS_1$ is used to produce address bit $A_4$, thus designating the first, or most significant, bit of code word $MPS_2$ which will be used to represent information word $S_2$. Also, ROM 15 determines the disparity of code word $MPS_1$, now stored in latch circuit 13, and this disparity is summed with the digital sum variation derived from all of the preceding code words. The resultant updated digital sum variation is produced at the output of adder 16 and is used by ROM 18 to produce address bit $A_5$. Hence, ROM 12 now is addressed to supply the appropriate code word $MPS_2$ to represent the information word $S_2$. At the next latch pulse CKA, which is produced at time $t_5$, this next code word $MPS_2$ is loaded into latch circuit 13.

Prior to loading the next-following code word $MPS_2$ into latch circuit 13, the preceding code word $MPS_1$ stored therein is loaded into shift register 14. It is seen that, at time $t_4$, the positive transition of load pulse $\overline{LDP}$ loads code word $MPS_1$ into shift register 14. Latch circuit 13 then is enabled to respond to the next-following latch pulse CKA to store the next-following code word $MPS_2$ therein.

Code word $MPS_1$, once loaded into shift register 14, is serially read out therefrom in response to each clock pulse CKC, as shown in FIG. 4F.

Two specific examples of encoding now will be described. Let it be assumed that code word $MPS_1$ terminates in a binary "1", and let it be further assumed that information word $S_2$ has the numerical value "4". Accordingly, ROM 12 is addressed by this information word to select set No. 5 which, as shown in FIG. 2, includes the code words [00110011] and [11001100]. Since the least significant bit of the preceding code word has been assumed to be a binary "1", address bit $A_4$ selects the code word [11001100] from set No. 5. In the particular example now discussed, it is appreciated that the disparity of each of the code words included in set No. 5 is equal to zero. Hence, further discrimination of the code word included in this set is independent of the preceding digital sum variation. Therefore, if the input information word has the numerical value "4", and if the preceding code word terminated in a binary "1", then ROM 12 now is addressed to produce the code word [11001100]. This code word is stored in latch circuit 13 and, subsequently, is loaded into shift register 14 and serially read out therefrom.

Let it now be assumed that the next-following input information word exhibits the numerical value "12". Accordingly, and as seen from the chart shown in FIG. 2, ROM 12 is addressed by this information word to select sets Nos. 13 and 21. Since the preceding code word terminated in a binary "0", address bit $A_4$ now supplied to ROM 12 serves to select the code word [01100111] from set No. 13 and to select the code word [01100001] from set No. 21.

If the digital sum variation derived from the preceding code words by adder 16 had been negative, then address bit $A_5$ will address ROM 12 to read out therefrom the code word [01100111]. It is appreciated that the disparity of this code word is positive which, when summed with the digital sum variation derived from the preceding code word, will reduce the digital sum variation towards zero. Conversely, if the digital sum variation derived from the preceding code words had been positive, then address bit $A_5$ will address ROM 12 to read out therefrom the code word [01100001]. This code word exhibits negative disparity which, when combined with the digital sum variation having positive polarity, reduces the digital sum variation towards zero. Thus, the appropriate code word is selected from ROM 12.

The foregoing description of the encoding technique in accordance with the present invention has assumed that the input information word is formed of four bits and is encoded into an 8-bit code word. However, the present invention is equally applicable to the encoding of information words which are formed of more or less than four bits. Moreover, it is not necessary that the code word be formed of twice the number of bits as the input information word. That is, $m \neq 2n$. The code word may be comprised of an even or odd number of bits. FIG. 5 is a chart which represents the total number of sets of code words which are available when $m=4, 5, 6, \ldots 15$ and 16, respectively. In FIG. 5, the left-most column represents the number of bits m included in the code word, and the top-most row represents the number a of majority bits included in that m-bit code word. Each column under $a=2, 3, 4, \ldots,$ represents the number of sets of code words which are available for the corresponding number of m bits. The right-most column of FIG. 5 represents the total number of available sets for each of the m-bit code words. It is recognized that the number of available sets when the code word is formed of m bits must be equal to or greater than $2^n$. Thus, 6-bit code words may be used to represent 2-bit information words, 7-bit code words may be used to represent 3-bit information words, 8-bit and 9-bit code words may be used to represent 4-bit information words, 10-bit and 11-bit code words may be used to represent 5-bit information words, 12-bit code words may be used to represent 6-bit information words, 13-bit code words may be used to represent 7-bit information words, 14-bit and 15-bit code words may be used to represent 8-bit information words and 16-bit code words may be used to represent 9-bit information words.

It is seen that, if the code word is formed of an odd number of bits, such as $m=9$, none of the code words will exhibit zero disparity. In that event, each set of code words is formed of four individual code words, two of which exhibit positive disparity and the other two of which exhibit negative disparity. Furthermore, and in accordance with the aforementioned criteria, one of the positive disparity code words commences with a binary "0" and the other commences with a binary "1". Likewise, one of the negative disparity code words commences with a binary "0" and the other commences with a binary "1". From the chart shown in FIG. 5, it is seen that, from the available 9-bit code words, twelve sets of code words are available with five binary "0"s or "1"s. Seven code words are available with six binary "0"s or "1"s. Two code words are available having seven binary "0"s or "1"s; and only one set of code words is available having eight binary "0"s or "1"s. Hence, twenty-two sets of 9-bit code words, each set being formed of four individual code words arranged in pairs, with both code words in one pair having positive disparity and both code words in the other pair having negative disparity, are available. It may alternatively be stated that both code words in one pair commence with a binary "0", one of which code words exhibits positive disparity and the other of which exhibits negative disparity, and both code words in the other pair commence with binary "1", with one of these code words exhibiting positive disparity and the other exhibiting negative disparity. Thus, one set of 9-bit code words may be as follows:

[000011111]—disparity=+1

[000011110]—disparity=−1

[111100000]—disparity=−1

[111100001]—disparity=+1

In the foregoing example of one set of 9-bit code words, pairs of complementary code words are used. As mentioned above, the use of complementary pairs of code words included in the same set is not necessary. Rather, each set of code words may be formed of four separate code words two of which commence with a binary "0" and exhibit disparities of equal but opposite polarities, and the other two of which commence with binary "1" and also exhibit disparities of equal magnitude but opposite polarities. In this example, one set of 9-bit code words thus may be formed of:

[000111110]—disparity=+1

[001111000]—disparity=−1

[100110011]—disparity=+1

[100011100]—disparity=−1

From FIG. 5, it also is appreciated that, when the number of bits m included in the code word is less than 8, the number of bits n included in the information word must be less than one-half the number of code word bits. It also is seen that when $m>12$, the number of bits n included in the information word may be more than one-half the number of code-word bits. That is, when $m \geqq 12$, $2n \geqq m$. For example, 13-bit code words may be used to represent 7-bit information words, 14-bit code words may be used to represent 8-bit information words and 16-bit code words may be used to represent 9-bit information words. To generalize, $2n \leqq m \leqq 12$; and $12<m \leqq 2n$. The use of the present invention to utilize a code word having less than twice the number of bits included in the information word is advantageous in that the wavelength of the recorded digital signal may be minimized and the bit-detecting window may be larger than when the code word contains twice the number of bits as the information word. For example, when an 8-bit information word is encoded into a 14-bit code word, the detecting window is seen to be $8/14=0.57$, which is, advantageously, larger than the detecting window of 0.5 when $2n=m$.

While the present invention has been particularly shown and described with reference to certain preferred embodiments, it will be readily appreciated by those of ordinary skill in the art that various changes and modifications in form and details may be made without departing from the spirit and scope of the invention. One embodiment of apparatus which is used to carry out the encoding technique of the present invention is illustrated in FIG. 3. The illustrated circuit may be modified, as described in the preceding discussion; and other equivalent encoding circuits may be used. It is intended that the appended claims be interpreted as including such changes and modifications.

What is claimed is:

1. A method of encoding successive n-bit information words into successive m-bit words having a minimum interval between bit transitions of at least 2T (where T is the bit interval of each code word), and a predetermined maximum interval between bit transitions, and wherein $m>n$, comprising the steps of storing for each n-bit information word a respective set of m-bit code words, each of predetermined ones of said sets being formed of two code words having zero disparity and one of said two code words commencing with a binary "0" bit and the other commencing with a binary "1" bit, and each of the remaining ones of said sets being formed of four code words, two of said four code words having positive disparity and commencing with binary "0" and binary "1" bits, respectively, and the remaining two code words having negative disparity and commencing with binary "0" and binary "1" bits, respectively; identifying in each set of code words assigned to an input information word those code words commencing with the same bit as the last bit of the immediately preceding code word; and addressing among the selected code words the code word whose disparity, when combined with the digital sum variation of the preceding encoded code words, reduces the overall digital sum variation of the encoded code words toward zero.

2. The method of claim 1 wherein said predetermined maximum interval between bit transitions is equal to 9T.

3. The method of claim 1 wherein $m=8$.

4. The method of claim 1 wherein $2n \leqq m \leqq 12$.

5. The method of claim 1 wherein $12<m \leqq 2n$.

6. The method of claim 1 wherein each m-bit code word in a set consists of at least two consecutive interior bits of the same logical sense.

7. The method of claim 1 wherein each m-bit code word in a set commences with no more than m/2 consecutive bits of the same logical sense.

8. A method of encoding successive n-bit information words into successive m-bit code words, wherein $m>n$, comprising the steps of storing $2^n$ sets of m-bit code words, each set representing a respective n-bit information word with predetermined ones of said sets each including two code words of zero disparity and having first bits of opposite logical sense, and with the remaining sets each including four code words, two of which have positive disparity and first bits of opposite logical sense and the other two of which have negative disparity and first bits of opposite logical sense; and addressing the stored code words to select a predetermined m-bit code word by using the n-bit information word to address the set of code words representative thereof, using the last bit of the preceding selected code word to address at least one of the code words in the addressed set whose first bit exhibits a predetermined relationship with said last bit, and using the digital sum variation of the preceding successing code words to address said at least one code word whose disparity, when combined with said digital sum variation, tends to reduce said digital sum variation toward zero.

9. The method of claim 8 wherein said step of using the digital sum variation of the preceding successive code word includes the steps of determining the running total of the digital sum variation of said preceding code words, storing said running total, and summing the stored running total with the disparity of the last-selected code word to update said running total.

10. The method of claim 9 wherein the disparity of the last-selected code word is determined by storing the disparity of the respective code words in said sets; and using said last-selected code word to read out the corresponding stored disparity thereof.

11. The method of claim 10 wherein the disparity of each stored code word is zero, positive or negative; and wherein the updated running total of said digital sum variation is used to selectively address said at least one code word whose disparity is not zero and is of opposite polarity to said updated running total.

12. The method of claim 8 wherein each stored m-bit code word includes at least two consecutive interior bits of the same logical sense.

13. The method of claim 12 wherein each stored m-bit code word commences with no more than a first predetermined number of consecutive bits of the same logical sense and terminates with no more than a second predetermined number of consecutive bits of the same logical sense.

14. The method of claim 8 wherein the first bit of the selected code word is of the same logical sense as the last bit of said preceding selected code word.

15. Apparatus for encoding successive n-bit information words into successive m-bit code words, wherein $m>n$, comprising input means for receiving an n-bit information word; means responsive to the received information word for selecting a set of code words including at least two m-bit code words each representative of said information word, said at least two code words having first bits of opposite sense and disparities of equal absolute magnitude, and each of said code words having at least two consecutive interior bits of the same logical sense; means for detecting the last bit of the preceding code word; means for determining the digital sum variation of the preceding successive code words; and means responsive to the detected last bit and determined digital sum variation for designating the m-bit code word in said selected set whose first bit is of the same logical sense as said detected last bit and whose disparity when combined with said determined digital sum variation reduces the digital sum variation toward zero.

16. The apparatus of claim 15 wherein predetermined ones of said n-bit information words are represented by respective sets of code words each set including two code words of zero disparity, and the remaining n-bit information words are represented by respective sets of code words each set including four code words two of which have first bits of opposite sense and equal positive disparities and two of which have first bits of opposite sense and equal negative disparities.

17. The apparatus of claim 16 wherein each m-bit code word in each selectable set commences with no more than a first predetermined number of consecutive bits of the same logical sense, and terminates with no more than a second predetermined number of consecutive bits of the same logical sense.

18. The apparatus of claim 16 wherein said means for selecting a set of code words comprises addressable memory means for storing each set of code words; and address means responsive to said received information word for addressing the memory means to select a stored set of code words.

19. The apparatus of claim 18 wherein said means for designating comprises additional address means responsive to said detected last bit for addressing the memory means to choose those code words in said selected set whose first bits are of the same logical sense as said detected last bit, said additional address means being further responsive to said determined digital sum variation to select from the chosen code words the code word whose disparity, when combined with said digital sum variation, reduces the digital sum variation toward zero.

20. The apparatus of claim 19 wherein said means for determining the digital sum variation comprises temporary store means for storing the digital sum variation, including polarity thereof, of the preceding m-bit code words; and means for updating the stored digital sum variation with the disparity of the next-succeeding selected code word.

21. The apparatus of claim 20 wherein said means for updating comprises an addressable memory for storing a representation of the disparity, including polarity thereof, of each code word included in a selectable set; read-out means responsive to said next-succeeding selected code word for addressing said memory to read out therefrom the representation of the disparity of said next-succeeding selected code word; and summing means for summing the read out representation and said stored digital sum variation, wherein the output of said summing means is stored in said temporary store means.

22. The apparatus of claim 21 wherein said additional address means is responsive to the output of said summing means to select from said chosen code words a code word having a disparity of opposite polarity to the polarity of said output of said summing means.

* * * * *